(12) United States Patent
Dhulst et al.

(10) Patent No.: US 11,881,352 B2
(45) Date of Patent: Jan. 23, 2024

(54) SUPERCONDUCTOR WITH TWISTED STRUCTURE

(71) Applicants: NV Bekaert SA, Zwevegem (BE); EPOCH WIRES LIMITED, Cambridge (GB)

(72) Inventors: Chris Dhulst, Oeselgem (BE); Jan Mestdagh, Oostrozebeke (BE)

(73) Assignees: NV BEKAERT SA, Zwevegem (BE); EPOCH WIRES LIMITED, Cambridge (GB)

( * ) Notice: Subject to any disclaimer, the term of this patent is extended or adjusted under 35 U.S.C. 154(b) by 73 days.

(21) Appl. No.: 17/258,260

(22) PCT Filed: Jul. 8, 2019

(86) PCT No.: PCT/EP2019/068193
§ 371 (c)(1),
(2) Date: Jan. 6, 2021

(87) PCT Pub. No.: WO2020/016035
PCT Pub. Date: Jan. 23, 2020

(65) Prior Publication Data
US 2021/0272731 A1 Sep. 2, 2021

(30) Foreign Application Priority Data
Jul. 19, 2018 (EP) .................... 18250014

(51) Int. Cl.
*H01F 6/06* (2006.01)
*H01F 41/07* (2016.01)
*H01F 41/04* (2006.01)

(52) U.S. Cl.
CPC ............. *H01F 6/06* (2013.01); *H01F 41/048* (2013.01); *H01F 41/07* (2016.01)

(58) Field of Classification Search
CPC .......... H01F 6/06; H01F 41/048; H01F 41/07; Y02E 40/60; H01B 12/16
(Continued)

(56) References Cited

U.S. PATENT DOCUMENTS 3,293,008 A * 12/1966 Allen ...................... H01L 39/24
87/8
3,428,925 A * 2/1969 Gunther ................... C25D 3/54
505/880
(Continued)

FOREIGN PATENT DOCUMENTS

DE 36 09 624 10/1987
DE 197 47 759 5/1998
(Continued)

OTHER PUBLICATIONS

International Search Report dated Sep. 6, 2019, in International (PCT) Application No. PCT/EP2019/068193.

*Primary Examiner* — Shawki S Ismail
*Assistant Examiner* — Lisa N Homza
(74) *Attorney, Agent, or Firm* — Wenderoth, Lind & Ponack, L.L.P.

(57) ABSTRACT

A superconductor (10, 30) has a twisted structure and is adapted to form windings in a superconducting coil. The superconductor (10, 30) comprises at least one superconductor wire. The superconductor further comprises at least one elongated electrical insulation element (18, 37). The elongated electrical insulation element(s) (18, 37) is/are twisted with or around the superconductor wire(s) in order to create a separation distance with an adjacent superconductor wire in a neighbouring winding, The elongated electrical insulation element(s) (18, 37) and the superconductor wire(s) may be twisted in one and the same twisting operation.

12 Claims, 2 Drawing Sheets

(58) Field of Classification Search
USPC ........................................................ 335/216
See application file for complete search history.

(56) References Cited

U.S. PATENT DOCUMENTS

| | | | |
|---|---|---|---|
| 3,444,307 A | 5/1969 | Kafka | |
| 3,600,498 A * | 8/1971 | Aupoix | H01B 3/04 174/15.5 |
| 3,643,002 A * | 2/1972 | Minnich | H01B 12/06 174/15.5 |
| 3,743,986 A * | 7/1973 | McInturff | H01B 12/10 29/599 |
| 3,983,521 A * | 9/1976 | Furuto | H01L 39/14 505/887 |
| 4,330,347 A * | 5/1982 | Hirayama | H01B 12/02 428/614 |
| 4,990,491 A * | 2/1991 | Wagner | H01L 39/14 428/688 |
| 5,204,650 A * | 4/1993 | Nemoto | H01L 39/20 505/879 |
| 6,510,604 B1 * | 1/2003 | Pourrahimi | H01F 6/06 29/599 |
| 6,534,718 B1 * | 3/2003 | Pourrahimi | H01F 6/06 29/599 |
| 2003/0121696 A1 * | 7/2003 | Pourrahimi | H01F 6/06 174/125.1 |
| 2004/0256126 A1 * | 12/2004 | Ashibe | H01R 4/68 174/15.5 |
| 2005/0061537 A1 * | 3/2005 | Yumura | H02G 15/34 174/125.1 |
| 2014/0187428 A1 * | 7/2014 | Goldacker | H01B 12/14 174/120 C |
| 2022/0005632 A1 * | 1/2022 | Sugimoto | H01B 12/14 |

FOREIGN PATENT DOCUMENTS

| | | | | |
|---|---|---|---|---|
| EP | 3926645 A1 * | 12/2021 | | |
| JP | 59-90905 | 5/1984 | | |
| JP | 01-187712 | 7/1989 | | |
| JP | 06349349 | * 8/1990 | | |
| JP | 05-217433 | 8/1993 | | |
| JP | 04104408 | * 12/1994 | ............ | Y02E 40/60 |
| WO | 2014/135893 | 9/2014 | | |

* cited by examiner

SUPERCONDUCTOR WITH TWISTED STRUCTURE

TECHNICAL FIELD

The invention relates to a superconductor and a method of manufacturing a superconductor.

BACKGROUND ART

Superconductors have a zero electrical resistance at very low temperatures.

In some applications, such as in magnetic resonance imaging apparatus or scanners (MRI), superconductors are wound in various windings to form coils. These coils are impregnated with resin.

The various windings need to be physically isolated and electrically and thermally insulated from each other. Physical isolation is needed to allow resin impregnation. Electrical separation of adjacent windings is needed to avoid short-circuit. Thermal insulation is needed between adjacent windings to a certain degree but not too much as a thermal disturbance must spread relatively quickly within the winding pack so that it can become detectable. In addition, the insulation material together with the resin must have a dielectric strength that is as high as possible.

In the prior art different techniques are available for this insulation.

One existing technique is the use of an insulating lacquer that surrounds the superconductor.

Another technique is the use of a fabric, a woven fabric or a braided fabric, with polymer or glass fibres, that is wound around the superconductor.

All existing techniques suffer from the fact that it is cumbersome and time consuming to apply the insulation around the superconductor.

DISCLOSURE OF INVENTION

It is a general object of the present invention to mitigate the drawbacks of the prior art.

It is a specific object of the present invention to provide in a simple way insulation on a superconductor.

It is a further object of the present invention to apply the insulation on a superconductor in line with other manufacturing steps. The terms "in line" herein refer to a continuous process in contrast with a batch process.

According to a first aspect of the present invention, there is provided superconductor with a twisted structure and adapted to form windings in a superconducting coil. The superconductor comprises at least one superconductor wire. The superconductor further comprises at least one elongated electrical insulation element. The elongated electrical insulation element is twisted with or around the superconductor wire in order to create a separation distance with an adjacent superconductor wire in a neighbouring winding.

The twisting operation results in one or more elongated insulation elements that are wrapped or twisted with or around the superconductor wire or wires without the elongated insulation elements crossing each other. The elongation insulation elements may be overlapping with each other or may have windings that overlap with each other. This twisting operation may be done in line with other upstream or downstream manufacturing steps.

The superconductor wire can have a cross-section in the form of a circle or a square or rectangle with rounded corners. The elongated insulation element can have a cross-section in the form of a circle, or a square, or a rectangle or any other suitable form that enables twisting.

The superconductor wire may be a multifilament wire or a monofilament wire. A multifilament wire forms physically one wire where superconducting filaments are embedded in a non-superconducting matrix, e.g. $MgB_2$ filaments with or without a diffusion barrier and embedded in a copper matrix.

In a preferable embodiment of the invention, the superconductor is a superconductor cable that has two or more superconductor wires that are twisted with each other. The elongated electrical insulation element or elements is/are twisted with or around these superconductor wires. The twisted superconductor wires are particularly advantageous in case a sintering operation is applied after twisting. Two or more metal tubes with the powders (Mg, B, and/or $MgB_2$) are twisted with each other without difficulties, since the brittle contiguous material of $MgB_2$ has not yet been formed. Only after twisting, a thermal treatment is applied to make the brittle ceramic $MgB_2$. This is particularly the case with the in-situ route with $MgB_2$.

Reversing the order of these steps, i.e. first applying a sintering and thereafter twisting the superconductors, would be more difficult since $MgB_2$ is a brittle material.

For the sake of understanding, the in-situ route starts from unreacted powders, Mg and B, and possible addition of one or more dopants. A heat treatment such as sintering is needed to obtain $MgB_2$.

In contrast, the ex-situ route already employs $MgB_2$ powder as starting material together with some dopants but still needs a thermal treatment as sintering to bond the $MgB_2$ particles.

The two or more superconductor wires are twisted with a first twist step or twist pitch or lay length. It is hereby understood that the terms twist step, twist pitch and lay length are synonyms. The elongated electrical insulation element has a second twist step or twist pitch or lay length. Most preferable the first twist step is equal to the second twist step. Equal twist steps in the same twist direction means that the twisting of the superconductor wires with each other and the twisting of the elongated electrical insulation element can be done in one and the same twisting operation. An advantage of using the same twist direction and twist step is that point to point to point pressure points are avoided since line contacts are established between the superconductor wires and the elongated electrical insulation elements. Particularly with respect to the brittleness of $MgB_2$ material, line contacts are the preferred solution.

The elongated electrical insulating element may be made of any material that is suitable for use in cryogenic environment, for example below 40 K and that may be twisted with the superconductor wire(s). Preferably, the elongated electrical insulating material must be compatible with vacuum impregnation.

The elongated electrical insulation element needs to withstand 1 kV (kilovolt), i.e. the electrical insulation needs to prevent jumps between cables in a coil of a potential of 1 kV or less.

The elongated electrical insulating element may be made of polymer such as polyester or polyimide.

The elongated electrical insulating element may be also made of glass. The elongated electrical insulating element may be a yarn comprising glass fibres. Typical glass fibres may be S-glass fibres or E-glass fibres. S-glass fibres are preferred in case a heat treatment step comes after the elongated insulation elements have been twisted with or around the superconductor wire(s). The reason is that S-glass fibres must survive the heat treatment.

For example S-glass fibres are preferred in case the in-situ route for $MgB_2$ is used and the sintering treatment of this in-situ route comes after the twist step.

In general a thermal treatment may reach temperatures in the range of 625° C. to 900° C., e.g. from 675° C. to 725° C., and this during several minutes to several hours, e.g. from 3 minutes to 15 minutes. A lower temperature of e.g. 650° C. may take several hours, a higher temperature of e.g. 800° C. may take some minutes.

Other glass fibres, different from S-glass fibres which survive the above-mentioned heat treatment are also preferred. In general glass fibres that survive the heat treatment are called heat-resistant glass fibres.

In contrast herewith E-glass fibres are not heat-resistant and may be used in case there is no longer a thermal treatment after the twisting. This may be the case in the ex-situ route. This may be also the case where the twist step comes after the thermal treatment.

In an alternative embodiment, the electrical insulation material may be incorporated in a tape. The tape has a radially inner side and a radially outer side after twisting around or with the superconductor. The radially outer side or layer is the electrical insulation material. The radially inner side or layer may be an electrically and thermally conducting material such as copper or aluminium.

The cross-sectional dimensions or thickness of the elongated electrical insulation elements determine the separation distance between neighbouring windings. The purpose is to keep this thickness as thin as possible when the superconductor is to be used in magnets for MRI scanners, since empty and unused spaces must be avoided as much as possible. This separation distance may range from 30 μm to 300 μm, e.g. from 50 μm to 250 μm.

The superconductor may also further comprise thermally and electrically conducting material. This material is needed in case of a slight increase above the critical temperature $T_c$. In such circumstances current is then transferred to any present electrically conductive and thermally conductive material so that local overheating is prevented. High conductivity materials such as copper, aluminium and silver are suitable materials for this purpose.

In case the powder-in-tube (PIT) technique is used, as is the case with $MgB_2$, Mg, B, $MgB_2$ and dopant powders are packed in one or more metal tubes or sheaths in order to be able to compact the Mg, B, $MgB_2$ and dopant powder mix until their final properties and dimensions. So the sheath material must be a material that can be mechanically deformed and that survives any heat treatments. Suitable sheath materials are copper, copper alloys, nickel, niobium, titanium, iron, stainless steel, nickel alloys as Monel, silver-magnesium, niobium-titanium. The sheath may also be a bimetallic sheath, with e.g. an inner layer of copper and an outer layer of stainless steel.

As superconducting material niobium-titanium, $Nb_3Sn$, NbZr or $Nb_3Al$ may be used. Preferably, as already mentioned, magnesium diboride $MgB_2$ is used.

WO-A1-2014/135893 discloses a preferable embodiment of the composition and arrangement of superconducting material inside the sheath.

A first set of in-situ constituents such as Mg with B, Nb with Ti, Nb with Zr, Nb with Al or Nb with Sn may form the core at the start of the manufacturing process.

A second set of ex-situ constituents such as $MgB_2$, NbTi, $Nb_3$, Snb, NBZr, or $Nb_3Al$ are arranged between the core and the sheath. This second set of constituents, next to acting as superconducting material, acts as barrier between the first set of constituents and the sheath material to prevent the first set of constituents from reacting with the sheath material.

Furthermore, dopants may be added to the superconducting material in order to pin any entering magnetic vortex. Examples of dopants are nitride boroxides, silicides such as SiC, carbon or carbon inorganics, metal oxides, metallic elements or organic compounds.

A highly preferable embodiment of a superconductor according to the invention, has a core+n+m structure, where n and m are integer numbers.

Preferably n and m range from three to nine and more, so n and m can be three, four, five, six, seven, eight, nine, . . . n can be equal to or different from m.

The core may be formed by a thermally and electrically conducting material or by a superconductor wire.

In a particular preferable embodiment, n superconductor wires are twisted around this core. n elongated electrically insulating elements are twisted with the n superconducting wires with the same twist step and same twist direction. Each elongated electrically insulating element faces two superconductors.

Since the same twist step is used, only one twist step is required for both the superconductor wires and the elongated electrically insulating elements.

Further advantages on this core+n+m structure will become apparent below in relation to FIG. 3.

During coil winding all voids are preferably avoided by a applying a resin to fill any empty spaces. Examples of suitable resins are epoxy based resins, urea resins, phenolic resins, unsaturated polyester resins, polyurethane resins, alkyd resins and melamine resins.

According to a second aspect of the present invention, there is provided a method of manufacturing a superconductor that is adapted to form windings in a superconducting coil. The method comprises the following steps:
  a) providing at least one superconductor wire;
  b) providing at least one elongated electrical insulation element;
  c) twisting the elongated insulation element(s) with or around the superconductor wire(s) in order to create a separation distance with an adjacent superconductor wire in a neighbouring winding.

In a preferable embodiment of the present invention, at least two superconductor wires are provided and at least two elongated electrically insulating elements are provided. The superconducting wires and electrically insulating elements are twisted with each other.

Most preferably, the superconducting wires are twisted simultaneously with the elongated electrically insulating elements with the same twist step.

The method of manufacturing a superconductor according to the second aspect of the invention may also comprise a heating step. The above-mentioned twisting step c) may be done before or after this heating step.

BRIEF DESCRIPTION OF FIGURES IN THE DRAWINGS

MODE(S) FOR CARRYING OUT THE INVENTION

Figure 1:
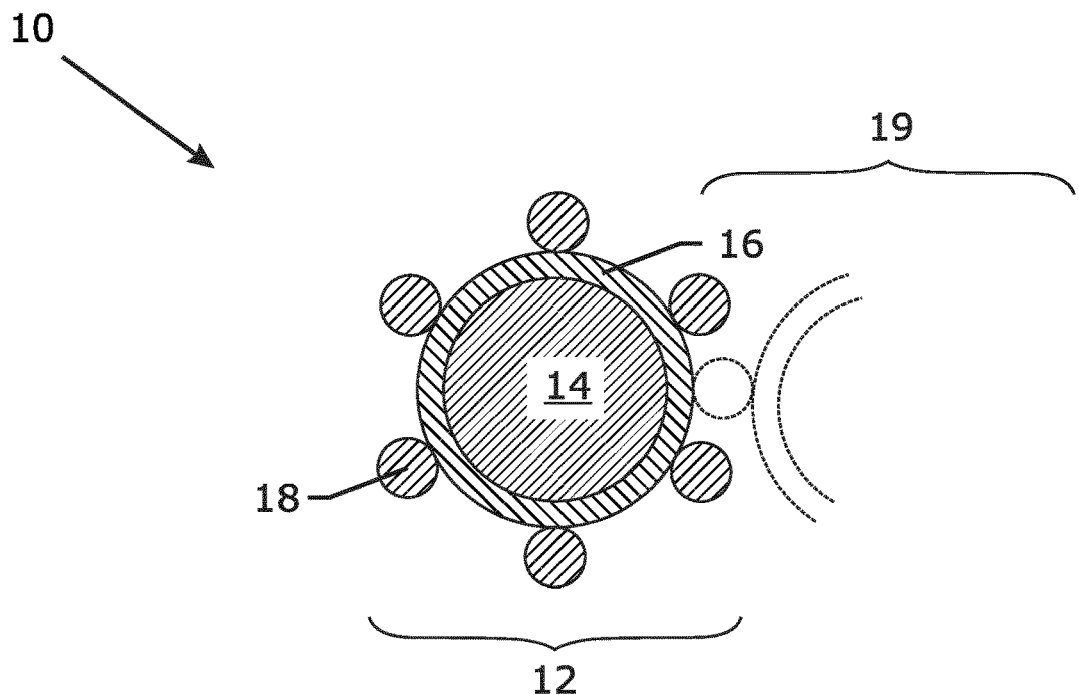
FIG. 1 shows a cross-section of a first embodiment of a superconductor.
Figure 2:
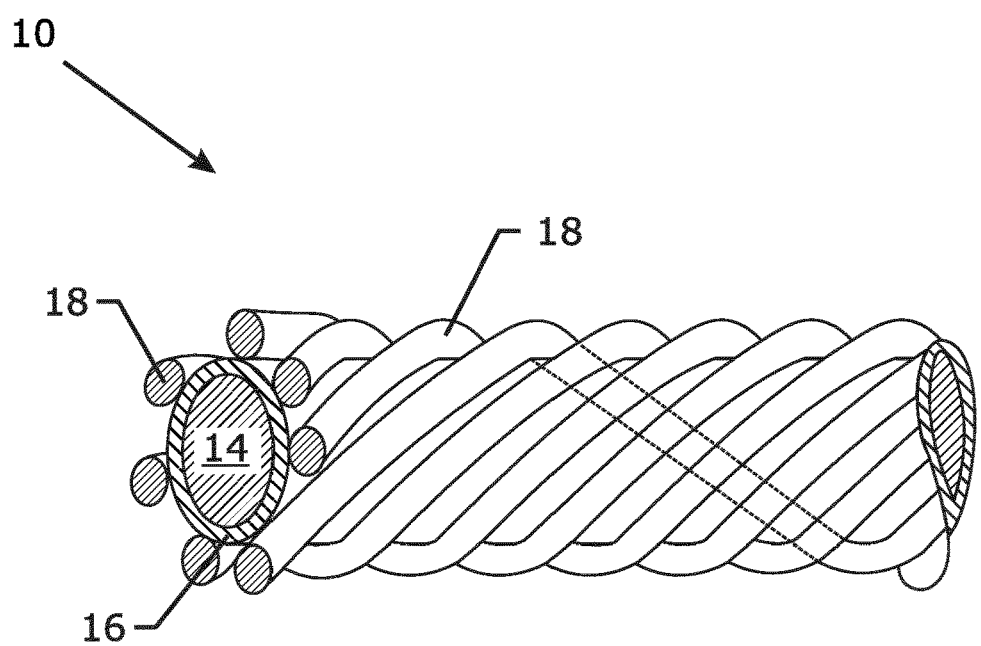
FIG. 2 shows a longitudinal view of this first embodiment of a superconductor.

FIG. 1 shows a cross-section of a first embodiment of a superconductor 10 according to the present invention and FIG. 2 shows a longitudinal view of this first embodiment of a superconductor 10.

A first winding 12 is shown in full lines.

The superconductor 10 has a core 14 with superconductive material, e.g. with $MgB_2$ and some dopants. The core 14 is surrounded by a sheath or tube 16 out of copper. Six polyester filaments 18 are wrapped around the sheath. As is clearly shown in FIG. 2, the polyester filaments 18 do not cross each other and thus avoid to create pressure points.

Part of a cross-section of a second adjacent winding 19 is shown in dash lines in FIG. 1.

By selecting the diameter and the number of the polyester filaments 18, the separation distance between two windings may be determined.

Figure 3:
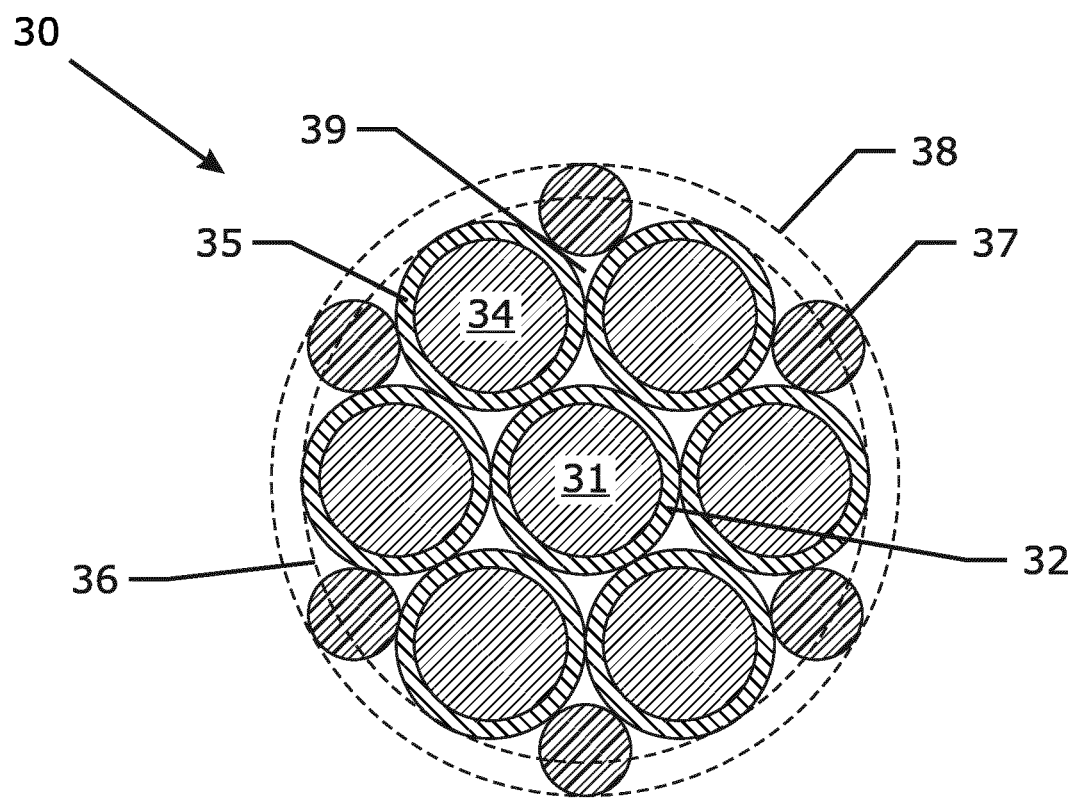
FIG. 3 is a cross-section of a second and preferable embodiment of a superconductor.

FIG. 3 is a cross-section of a second and preferable embodiment of a superconductor 30 cable. Superconductor cable 30 has a core 31 of copper that functions as thermally and electrically conducting material in case of an increase in temperature. The copper core 31 has a sheath 32 of tin. The function of tin is to enhance temperature and current transfer between superconductor wires in case of a fracture of a wire or in case of a quench of one or more wires in the superconductor. Another advantage of tin is that tin consolidates the structure. Six superconductor wires are twisted around the copper core 31. Each superconductor wire has a core 34 with superconducting material, e.g. $MgB_2$ and a metallic sheath 35. The metallic sheath 35 can be made of iron or can be made of copper. The six superconductor wires with the sheath 34-35 form a circumscribed circle 36, that is shown in dash lines. Six S-glass yarns 37 are also twisted around the around the copper core 31 with the same twist step and in the same direction as the superconductor wires. Each S-glass yarn 37 faces two superconductor wires. Each S-glass yarn 37 protrudes out of the circumscribed circle 36 to create the separation distance. The six S-glass yarns 37 form a circumscribed circle 38, that is shown in a dot and dash lines. The distance between the circumscribed circle 36 and the circumscribed circle 38 is the separation distance. By their positioning the six S-glass yarns 37 fill part of the empty space that is created radially outside and between two superconducting wires leaving only small voids 39. The six S-glass yarns 37 provide stability to the twisted construction of the superconductor 30. In addition, the six S-glass yarns 37 function as distance holder between neighbouring windings so that resin can infiltrate. The diameter or thickness of the S-glass yarns 37 is greater than the separation distance. This means that thicker and stronger elongated electrically insulating elements can be used and still have a limited separation distance between windings. Thicker elongated electrically insulated elements are stronger and more robust and will allow faster twisting and production.

Typical dimensions for the superconductor cable 30 are:
diameter of the superconductor wire 34 with sheath 35: 750 µm;
diameter of the S-glass yarn 37: 200 µm.

In general for MRI applications, the diameter of the superconductor wires may range between 250 µm and 1000 µm, as long as the total diameter of the superconductor does not exceed 3.0 mm, preferably does not exceed 2.5 mm.

For use as power transmission, the dimensions may be much greater.

FIG. 3 shows a 1+6+6 superconductor cable 30. However, any 1+n+m superconductor with n and m ranging from three on, has the same advantages as long as the superconductor wires and the elongated electrical insulating elements have the same twist direction and twist step.

A superconductor according to the invention is preferably used in a superconducting magnet of a magnetic resonance imaging apparatus. A superconductor according to the invention may also be applied in magnetic levitating vehicles, superconducting electromagnetic propulsion ships, nuclear fusion reactors, superconducting generators, accelerators, electron microscopes, energy storing apparatus, magnetic separators and power cables.

LIST OF REFERENCE NUMBERS 10 first embodiment of a superconductor
12 one winding of superconductor 10
14 core with superconducting material
16 metal tube or sheath
18 insulating polymer fibre
19 adjacent winding
30 second embodiment of a superconductor
31 copper core of superconductor
32 sheath of tin around copper core 31
34 core of superconducting material of superconductor wire
35 copper sheath around core of superconducting wire
36 circumscribed circle formed by superconducting wire
37 insulating S-glass yarn
38 circumscribed circle formed by S-glass yarns
39 voids inside twisted structure of superconductor

The invention claimed is:

1. A superconductor cable having a twisted structure, the superconductor cable comprising:
   at least two superconductor wires, and
   at least one elongated electrical insulation element,
   wherein the at least two superconductor wires and the at least one elongated electrical insulation element are separate elements in the superconductor cable,
   wherein the at least two superconductor wires are twisted with each other, and
   wherein the at least one elongated electrical insulation element is twisted with or around the at least two superconductor wires in order to create a separation distance with an adjacent superconductor wire in a neighbouring winding.

2. The superconductor cable according to claim 1, wherein the at least one elongated electrical insulation element is made of a polymer or of glass.

3. The superconductor cable according to claim 2, wherein the at least one elongated electrical insulation material is made of heat resistant glass fibres.

4. The superconductor cable according to claim 3, wherein the heat resistant glass fibres are S-glass fibres.

5. The superconductor cable according to claim 2, wherein the at least one elongated electrical insulation material is incorporated in a tape,
   wherein the tape has a radially inner side and a radially outer side after twisting, wherein
   the radially outer side is the electrical insulation material.

6. The superconductor cable according to claim 5, wherein the radially inner side is a thermally and electrically conducting material.

7. The superconductor cable according to claim 1, wherein the separation distance ranges from 30 µm to 300 µm.

8. The superconductor cable according to claim 1, the superconductor further comprising a core formed by a thermally and electrically conducting material or by a superconductor wire,
    wherein the superconductor has a core+n+m structure,
    wherein n and m are integer numbers,
    wherein n superconductor wires are twisted around said core, and
    wherein m elongated electrically insulating elements are twisted with the n superconducting wires around the core.

9. The superconductor cable according to claim 8,
wherein n is equal to m,
wherein n and m are greater than three, and
    wherein each elongated electrically insulating element faces two superconductor wires.

10. The superconductor cable according to claim 1,
    wherein the superconductor wires comprise $MgB_2$ as a superconducting material.

11. A method of manufacturing the superconductor cable according to claim 1, the method comprising the following steps:
    a) providing at least two superconductor wires;
    b) providing at least one elongated electrical insulation element;
    c) twisting the at least one elongated insulation element with or around the at least two superconductor wires in order to create a separation distance with an adjacent superconductor wire in a neighbouring winding.

12. The superconductor cable according to claim 1, wherein the at least one elongated electrical insulation element comprises a yarn.

* * * * *